US009418315B1

(12) United States Patent
Keogh et al.

(10) Patent No.: US 9,418,315 B1
(45) Date of Patent: Aug. 16, 2016

(54) SYSTEMS, METHODS, AND COMPUTER READABLE MEDIA FOR EXTRACTING DATA FROM PORTABLE DOCUMENT FORMAT (PDF) FILES

(71) Applicant: Sageworks, Inc., Raleigh, NC (US)

(72) Inventors: Timothy Francis Keogh, South Burlington, VT (US); Brian Hamilton, Cary, NC (US)

(73) Assignee: Sageworks, Inc., Raleigh, NC (US)

( * ) Notice: Subject to any disclaimer, the term of this patent is extended or adjusted under 35 U.S.C. 154(b) by 0 days.

(21) Appl. No.: 15/069,913

(22) Filed: Mar. 14, 2016

(51) Int. Cl.
*G06K 9/00* (2006.01)
*G06K 9/62* (2006.01)
*G06F 17/30* (2006.01)

(52) U.S. Cl.
CPC ........ *G06K 9/6232* (2013.01); *G06F 17/30253* (2013.01)

(58) Field of Classification Search
CPC .......... G06K 9/00469; G06K 9/00456; G06K 9/00442; G06K 9/00449; G06K 9/00483; H04N 1/00748; H04N 2201/0081
USPC ......................................................... 382/190
See application file for complete search history.

(56) References Cited

U.S. PATENT DOCUMENTS

| | | | |
|---|---|---|---|
| 7,013,309 B2 * | 3/2006 | Chakraborty | ....... G06F 17/2241 |
| 8,695,096 B1 | 4/2014 | Zhang | |
| 8,885,951 B1 * | 11/2014 | Cristofano | ......... G06K 9/00449 |
| | | | 382/173 |
| 2011/0280490 A1 * | 11/2011 | Sarkar | ................ G06K 9/00442 |
| | | | 382/209 |
| 2013/0290270 A1 * | 10/2013 | Pareek | .............. G06F 17/30011 |
| | | | 707/687 |
| 2014/0177004 A1 * | 6/2014 | Song | .................. H04N 1/00005 |
| | | | 358/3.26 |

OTHER PUBLICATIONS

"Could itextpdf extract tabular data from a multipage, complex PDF like a IRS Form 1065? (Computer generated)," pp. 1-2 (Apr. 1, 2015).

* cited by examiner

*Primary Examiner* — Stephen R Koziol
*Assistant Examiner* — Shaghayegh Azima
(74) *Attorney, Agent, or Firm* — Jenkins, Wilson, Taylor & Hunt, P.A.

(57) ABSTRACT

According to one method, the method occurs at a data file analyzer. The method includes identifying at least one document identifier associated with a first document in a portable document format (PDF) file. The method further includes determining, using the at least one document identifier, a reference point identifier for identifying a reference point in the first document, an offset value for indicating a location of a first detection area in the first document, and size information for indicating a size of the first detection area in the first document. The method also includes identifying, using a reference point identifier, the reference point in the first document. The method further includes identifying, using the offset value and the size information, the first detection area in the first document and extracting, by processing binary data of the PDF file, data within the first detection area of the first document.

21 Claims, 8 Drawing Sheets

Form 1065 — U.S. Return of Partnership Income

Department of the Treasury
Internal Revenue Service

For calendar year 2014, or tax year beginning _______, ending _______

OMB No. 1545-0123

2014

| | | |
|---|---|---|
| A Principal business activity | Name of partnership | D Employer identification number |
| Landscaping | Whitewater Landscaping | 22-8462552 |
| B Principal product or service | Number, street, and room or suite no. If a P.O. box, see the instructions. | E Date business started |
| Grass | 500 Amber Drive | |
| C Business code number | City or town, state or province, country, and ZIP or foreign postal code | F Total assets |
| 236110 | Whitewater    WI  53190 | $ 1980289. |

G Check applicable boxes: (1) ☐ Initial return  (2) ☐ Final return  (3) ☐ Name change  (4) ☐ Address change  (5) ☐ Amended return
(6) ☐ Technical termination - also check (1) or (2)

H Check accounting method: (1) ☐ Cash  (2) ☐ Accrual  (3) ☐ Other (specify) ▶ _______

I Number of Schedules K-1. Attach one for each person who was a partner at any time during the tax year  ▶ 3

J Check if Schedules C and M-3 are attached  ☐

Caution. *Include only* trade or business income and expenses on lines 1a through 22 below. See the instructions for more information.

Income

| | | | |
|---|---|---|---|
| 1 a Gross receipts or sales | | 1a | 1032566. |
| b Returns and allowances | | 1b | 46624. |
| c Balance. Subtract line 1b from line 1a | | 1c | 985942. |
| 2 Cost of goods sold (attach Form 1125-A) | | 2 | 13138. |
| 3 Gross profit. Subtract line 2 from line 1c | | 3 | 20004. |
| 4 Ordinary income (loss) from other partnerships, estates, and trusts (attach statement) | | 4 | 465. |

| | | | | |
|---|---|---|---|---|
| Yohan Werner | | | | |
| 450 Herbert Way | | | | |
| Raleigh, NC 27613 | | | | |

| F | Shareholder's percentage of stock ownership for tax year | 33.000000% |
|---|---|---|

| 10 | Other income (loss) | | 15 | Alternative min tax (AMT) items | |
|---|---|---|---|---|---|
| A | | 165. | A | | 4907. |
| B | | 107. | F* | | Stmt |
| D | | 338. | | | |
| E | | 151. | | | |
| 11 | Section 179 deduction | 164. | 16 | Items affecting shareholder basis | |
| | | | A | | 287. |
| 12 | Other deductions | | B | | 284. |
| A | | 3621. | C | | 2745. |
| B | | 228. | D | | 495. |
| C | | 88. | | | |
| D | | 1642. | 17 | Other information | |
| E | | 33. | A | | 6030. |
| F | | 2227. | B | | 1598. |
| G | | 2160. | V* | | Stmt |
| H | | 2134. | | | |
| * | | Stmt | | | |

402 (pointing to box around item 12 Other deductions)
404 (pointing to box around item 16 Items affecting shareholder basis)

For IRS Use Only

5112/1 10-26-15  JWA  For Paperwork Reduction Act Notice, see Instructions for Form 1120S. * See attached statement for additional information. IRS.gov/form1120s Schedule K-1 (Form 1120S) 2015

500

Yohan Werner
450 Herbert Way
Raleigh, NC 27613

F  Shareholder's percentage of stock
   ownership for tax year .......... 33.000000%

| 10 | Other income (loss) | | 15 | Alternative min tax (AMT) items |
|---|---|---|---|---|
| A | | 165. | A | 4907. |
| B | | 107. | F* | Stmt |
| D | | 338. | | |
| E | | 151. | | |
| 11 | Section 179 deduction | | 16 | Items affecting shareholder basis |
| | | 164. | A | 287. |
| 12 | Other deductions | | | |
| A | | 3621. | B | 284. |
| B | | 228. | C | 2745. |
| C | | 88. | D | 495. |
| D | | 1642. | 17 | Other information |
| E | | 33. | A | 6030. |
| F | | 2227. | B | 1598. |
| G | | 2160. | V* | Stmt |
| H | | 2134. | | |
| * | | Stmt | | |

502 → A 3621.
504 → B 228.
506 → D 495.

*See attached statement for additional information.

For Paperwork Reduction Act Notice, see Instructions for Form 1120S.    IRS.gov/form1120s    Schedule K-1 (Form 1120S) 2015

For IRS Use Only

FIG. 5

600 the value for sched K1, line SSN using x/y 111/448, h/w 12/63 = 100-77-3895, saving 100-77-3895.
the value for sched K1, line Name using x/y 97/401, h/w 30/63 = Henry George, saving Henry George
the value for sched K1, line L2 using x/y 267/157, h/w 12/63 = 6,105, F., saving 6105.
the value for sched K1, line L4 using x/y 267/133, h/w 12/63 = (590.) I., saving 590.
the value for sched K1, line 4 using x/y 414/614, h/w 12/20 = 26,598., saving 26598.
the value for sched K1, line 5 using x/y 414/590, h/w 12/20 = 264., saving 264.
the value for sched K1, line 6a using x/y 414/566, h/w 12/20 = 132., saving 132.
the value for sched K1, line 8 using x/y 414/494, h/w 12/20 = 33., saving 33.
the value for sched K1, line 9a using x/y 414/470, h/w 12/20 = 36., saving 36.
the value for sched K1, line 10 using x/y 414/398, h/w 12/20 = 46., saving 46.
the value for sched K1, line 13a using x/y 299/238, h/w 50/130 = A 331. B 331. saving A 331.
the value for sched K1, line 13b using x/y 414/248, h/w 12/20 = 331., saving 331.

SAGEWORKS CREDIT ANALYSIS WITH AG
Add/Edit  Activities  Perform Analysis  Reports  Tools/Extras  My Account Log Out Support

| Form 1040 | Sched A | Sched C | Sched D | Sched E | Sched III | Sched F | 1065 K-1 | 1120S K-1 | Basic Tax Entry |

PERSONAL TAX RETURN
GRONK, ROB

Please enter the amounts in the boxes that correspond to the appropriate line numbers in the tax form. When you are done, click Save and Continue to proceed to the next schedule or click the desired schedule above. Please enter only amounts that are both regular and recurring. Tip: Want a Calculator?

| Form 1040 | U.S. Individual Income Tax Return | 2015 |

| 7 | Wages, salaries, tips, etc. Attach Form(s) W-2 | 7 | 188,505 | ← INVALID? |
| 8a | Taxable interest. Attach Schedule B if required | 8a | 14,850 |
| 8b | Tax-exempt interest. Do not include on line 8a | 8b | 10,110 |
| 9a | Ordinary dividends. Attach Schedule B if required | 9a | 100 |
| 10 | Taxable refunds, credits, or offsets of state and local income taxes | 10 | |
| 11 | Alimony received | 11 | 145 |
| 12 | Business income or (loss). Attach Schedule C or C-EZ (Note: We do not use this line for cash flow purposes. Instead, we use the amounts entered on the Schedule C) | 12 | 125,944 |
| 13 | Capital gain or (loss). Attach Schedule D if required. (Note: If you are entering K-1's, please enter the full amount from line 13 on this line. Otherwise, enter *regular* and *dependable* amounts only) | 13 | -3,000 |
| 14 | Other gains or (losses). Attach Form 4797 (enter *regular* and *dependable* amounts only) | 14 | 14,500 |
| 15a | IRA distributions (Note: If your form has only an amount under 15b, please input that full amount here. Exclude rollover amounts) | 15a | 98,654 |
| 16a | Pensions and annuities (Note: If your form has only an amount under 16b, please input that full amount here) | 16a | 0 |

SYSTEMS, METHODS, AND COMPUTER READABLE MEDIA FOR EXTRACTING DATA FROM PORTABLE DOCUMENT FORMAT (PDF) FILES

TECHNICAL FIELD

The subject matter described herein relates generally to data analysis and, more particularly, to systems, methods, and computer readable media for extracting data from portable document format (PDF) files.

BACKGROUND

Manual data entry can be error-prone, tedious, and time consuming. However, there is a lack of easily automated methods for extracting data in a portable document format (PDF) and/or other data files. While some technologies, such as optical character recognition (OCR) technologies, exist for helping extract data from images, such technologies are imperfect and can result in various errors or misidentifications. Further, even using OCR technologies, data extraction generally requires a human to proofread and correct errors.

SUMMARY

Methods, systems, and computer readable media for extracting data from a portable document format (PDF) file are disclosed. According to one method, the method occurs at a data file analyzer. The method includes identifying at least one document identifier associated with a first document in a PDF file. The method further includes determining, using the at least one document identifier, a reference point identifier for identifying a reference point in the first document, an offset value for indicating a location of a first detection area in the first document, and size information for indicating a size of the first detection area in the first document. The method also includes identifying, using a reference point identifier, the reference point in the first document. The method further includes identifying, using the offset value and the size information, the first detection area in the first document. The method also includes extracting, by processing binary data of the PDF file, data within the first detection area of the first document.

According to one system, the system includes a data file analyzer. The data file analyzer includes at least one processor and a memory. The data file analyzer is configured to identify at least one document identifier associated with a first document in a PDF file, to determine, using the at least one document identifier, a reference point identifier for identifying a reference point in the first document, an offset value for indicating a location of a first detection area in the first document, and size information for indicating a size of the first detection area in the first document, to identify, using a reference point identifier, the reference point in the first document, to identify, using the offset value and the size information, the first detection area in the first document, and to extract, by processing binary data of the PDF file, data within the first detection area of the first document.

The subject matter described herein may be implemented in software in combination with hardware and/or firmware. For example, the subject matter described herein may be implemented in software executed by a processor. In some implementations, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term 'node' refers to at least one physical computing platform including one or more processors and memory. For example, a node may include a virtual machine and/or other software executing on a physical computing platform.

As used herein, the terms 'function' or 'module' refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media extracting data from portable document format (PDF) files and/or data files. Digital documents, e.g., documents stored in PDF files and/or other data files, may include tabular data and/or semi-constrained data. For example, tax and/or accounting programs may generate Internal Revenue Service (IRS) tax forms containing text, values, and/or other data and may store these forms in a PDF file. While a particular IRS tax form (e.g., an IRS Form 1040) for a given year is somewhat uniform in its content and layout, every tax and/or accounting program may generate a slightly different version of the form with various data in slightly different locations. As such, even with a data file containing semi-constrained data, various issues can arise when attempting to export, extract, or obtain data from the data file.

In accordance with some aspects of the subject matter described herein, techniques, methods, or mechanisms for identifying and exporting data (e.g., characters, text, numbers, etc.) at specific locations in a document stored in a data file are described herein. For example, a data file analyzer in accordance with some aspects described herein may identify and/or define a detection area that represents a portion of a document or page thereof in a data file for data extraction. In this example, the data file analyzer may use functionality that processes binary data of the data file representing a document portion indicated by the detection area such that the binary data is converted, derived, or decoded into human-readable data (e.g., text and/or numbers depicted when viewing the document portion in a PDF viewer application).

In accordance with some aspects of the subject matter described herein, techniques, methods, or mechanisms are described herein for identifying and/or defining a detection area using a reference point identifier, an offset value, and size information for indicating a size of the detection area. For example, a data file analyzer in accordance with some aspects described herein may identify or locate a reference point (e.g., the location of a predetermined phrase, such as "Salaries and wages") in a digital document and may then move an amount of pixels to the right of the reference point based on a predetermined offset value and may extract or read data within the detection area (e.g., a 20 pixel wide and 5 pixel high rectangle or box) as indicated by predetermined size information.

Advantageously, in accordance with some aspects of the subject matter described herein, by using reference points and/or offset values to identify detection areas for data extraction, data extraction from a data file can be more flexible. For example, by searching for a keyword in a PDF document and then using offset values from the keyword to identify an area for data extraction, an exact location (e.g., x- and y-coordinates) for data extraction does not needed to be known beforehand and, as such, similar but different forms can be processed. Further, by using functionality that can process a PDF file and extract (e.g., obtain, convert, derive, or decode) human-readable data (e.g., text, numbers, etc.) from binary data (e.g., non-human-readable data or file data) of the PDF file, data extraction can be more reliable than other techniques, such as image analysis or optical character recognition (OCR) techniques. For example, instead of recognizing what a character is based on an image analysis, aspects described herein can perform data analysis on binary data in a data file which can accurately and reliably identify the character since the binary data stores a representation of the character using a known data format, e.g., based on PDF specifications.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
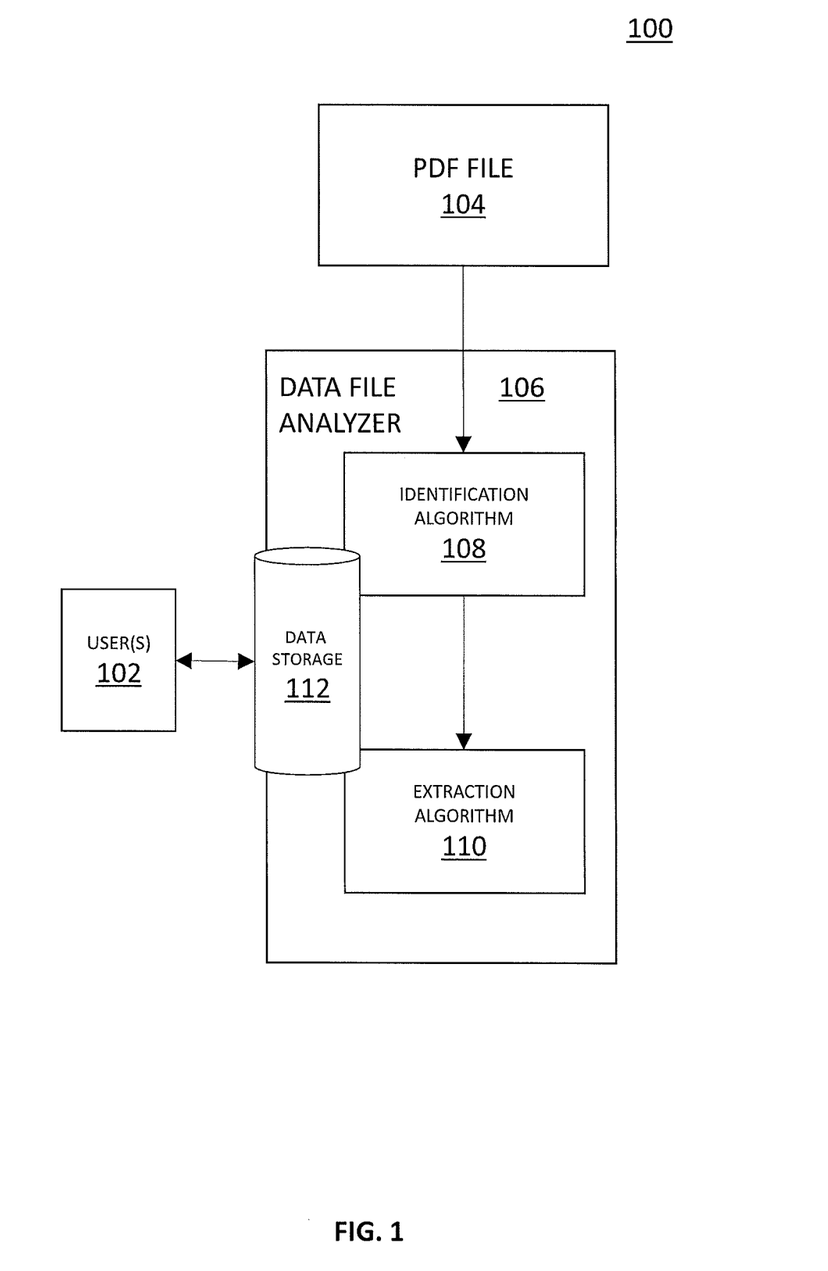
FIG. 1 is a diagram illustrating a computing environment according to an embodiment of the subject matter described herein.

FIG. 1 is a diagram illustrating a computing environment 100 according to an embodiment of the subject matter described herein. Computing environment 100 may include one or more computing platforms and/or devices and/or entities associated with interacting with one or more data files, such as PDF files. Computing environment 100 may include one or more user(s) 102, a PDF file 104, and a data file analyzer 106.

User(s) 102 may be any suitable entity (e.g., an automated system or a device or system controlled or controllable by a human user) for configuring and/or using data file analyzer 106 and/or related functions. For example, various user interfaces (e.g., an application user interface (API) and a graphical user interface (GUI)) may be provided for specifying, defining, or implementing rules or mapping information for identifying documents in PDF file 104 and/or for extracting or obtaining data from PDF file 104. Exemplary user interfaces for configuring and/or using data file analyzer 106 may support automation (e.g., via one or more scripting languages) and may include a representation state transfer (REST) API, a command line, and/or a web based GUI.

In some embodiments, user(s) 102 may include a provisioning user, a system operator, or a service operator. For example, user(s) 102 may be a programmer, an administrator, or another entity that provisions data file analyzer 106 with information for performing data extraction and/or other data analysis functions. In this example, user(s) 102 may provide predetermined information (e.g., mapping information for identifying documents and detection areas) about a plurality of documents that may be represented, stored, or depicted (e.g., as binary data) in a PDF file.

PDF file 104 may represent any data file containing information stored using a PDF format or another data format (e.g., PostScript or extensible markup language (XML) Paper Specification) usable for storing one or more documents. For example, PDF file 104 may store data that represents a complete description of one or more documents, including text, fonts, graphics, and other information needed to display these documents. In this example, PDF file 104 may store the documents as binary data, e.g., non-human-readable data or file data. Continuing with this example, while a PDF reader application can display documents stored in PDF file 104, data file analyzer 106 and/or related functionality may be required to extract or obtain human-readable data (e.g., text, numbers, etc.) from the binary data of PDF file 104.

Data file analyzer 106 may represent any suitable entity (e.g., a processor executing software) for performing aspects associated with data analysis, file analysis, document analysis, and/or data extraction (e.g., any method for obtaining data stored in PDF file 104).

In some embodiments, data file analyzer 106 may include functionality for receiving and processing one or more data files. For example, data file analyzer 106 may provide a user interface to allow a user to upload one or more PDF files associated with a business, an individual, or a married couple. In this example, data file analyzer 106 may then utilize one or more algorithms for analyzing and/or extracting data from the uploaded PDF files.

In some embodiments, data file analyzer 106 may include functionality for identifying various documents and/or pages stored in PDF file 104. In some embodiments, data file analyzer 106 may include functionality for extracting and/or obtaining data stored in PDF file 104. For example, data file analyzer 106 may use predetermined mapping information associated with an identified document or page thereof to extract or obtain data stored in PDF file 104. In this example, the predetermined mapping information is usable for identifying and/or defining detection areas (e.g., defined areas or portions of a document or a page thereof) in PDF file 104.

Data file analyzer 106 may include and/or access data storage 112. Data storage 112 may represent any suitable entity (e.g., a non-transitory computer readable medium, embedded memory, or a memory device) for storing data associated with extracting data from PDF file 104 and/or other data files. Data storage 112 may store software and/or logic associated with one or more algorithms associated with various aspects or functionality described herein. Data storage 112 may also store associations between document identifiers and mapping information for identifying and/or defining detection areas. Data storage 112 may include data obtained from PDF file 104 in one or more data structures, such as associative arrays, hash maps, linked lists, and/or data stores.

In some embodiments, data file analyzer 106 may include one or more algorithms (e.g., software and/or logic) that perform various aspects or functions. For example, data file analyzer 106 may include an identification algorithm 108 for identifying document or related identifiers and an extraction algorithm 110 for extracting texts from detection areas in PDF file 104. In this example, identification algorithm 108 may be used in conjunction with extraction algorithm 110 when performing data analysis and/or data extraction.

In some embodiments, data storage 112 may be accessible by data file analyzer 106, identification algorithm 108, extraction algorithm 110, and/or other entities. In some embodiments, data storage 112 may be located on a single device or computing platform or may be distributed across multiple devices or computing platforms.

Identification algorithm 108 may represent software and/or logic for identifying one or more documents or pages in PDF file 104. In some embodiments, identification algorithm 108 may be configured to search and/or analyze PDF file 104 for different documents. For example, assuming PDF file 104 contains multiple tax forms or other documents, identification algorithm 108 may identify document boundaries (e.g., starting and ending page numbers) for each document. In this example, identification algorithm 108 may use extraction algorithm 110 or related functionality for identifying each of the documents, e.g., by searching each page for document identifiers.

In some embodiments, identification algorithm 108 may use predetermined or known information for identifying document identifiers. For example, identification algorithm 108 may access a data store of known identifiers, such as tax form numbers or a tax form year numbers, and identification algorithm 108 may be configured to search a top middle portion or a bottom left portion of each page in PDF file 104 for one or more of these identifiers. In another example, identification algorithm 108 may be configured to search metadata (e.g., file properties) associated with PDF file 104 for particular known identifiers, such as a PDF file producer application identifier, e.g., a name of a tax and/or accounting software package that generates PDF file 104.

Extraction algorithm 110 may represent software and/or logic for extracting or obtaining data stored in PDF file 104. In some embodiments, extraction algorithm 110 may be configured to identify and/or define one or more detection areas in a document or page thereof in PDF file 104. For example, extraction algorithm 110 may use predetermined mapping information to locate and/or define a detection area (e.g., a virtual geometric shape) containing a data field (e.g., text or numbers associated with a label, line number, or other data identifier) in an Internal Revenue Service (IRS) Form 1040 in PDF file 104. In this example, extraction algorithm 110 may identify and/or define a detection area by identifying one or more reference points in the document, e.g., by searching for reference point identifiers, such as a line number, a label, a number, or one or more characters, in the document. Once the one or more reference points are identified, extraction algorithm 110 may discern or identify the top left corner of the detection area by adding any known offset values to x- and/or y-coordinate values associated with the one or more reference points. Continuing with this example, after discerning or identifying the top left corner of the detection area, extraction algorithm 110 may further define the detection area using predetermined height and width values and may then extract data within the defined detection area.

In some embodiments, extraction algorithm 110 may include functionality for processing binary data (e.g., data formatted according to a PDF specification) of PDF file 104 representing a document portion indicated by a detection area such that extraction algorithm 110 can identify, discern, decode, or convert the binary data into the human-readable data (e.g., text and/or numbers) that it represents.

In some embodiments, extraction algorithm 110 may communicate with another entity (e.g., a module, a software library, or separate logic) for extracting data from PDF file 104. For example, extraction algorithm 110 may be configured to send coordinates representing a detection area to a PDF file reader (and/or a related API). In this example, the PDF file reader may identify and interpret binary data of PDF file 104 representing a document portion indicated by the coordinates and may return human-readable data associated with the document portion.

In some embodiments, data file analyzer 106, identification algorithm 108, and/or extraction algorithm 110 may filter, parse, and/or modify extracted or obtained data from PDF file 104. For example, after extracting data (e.g., 'A.3621.') from a detection area, extraction algorithm 110 may be configured to identify a label, a number, a letter, or other data identifier (e.g., 'A') for a portion of the extracted data and may use the identifier to store the data portion adjacent to the identifier (e.g., '3621.') in an appropriate data structure in data storage 112.

It will be appreciated that FIG. 1 is for illustrative purposes and that various nodes, their locations, and/or their functions (e.g., modules or algorithms) described above in relation to FIG. 1 may be changed, altered, added, or removed. For example, some nodes, algorithms, and/or functions may be combined into a single entity. In another example, some nodes, algorithms, and/or functions may be distributed across multiple nodes and/or platforms.

Figure 2:
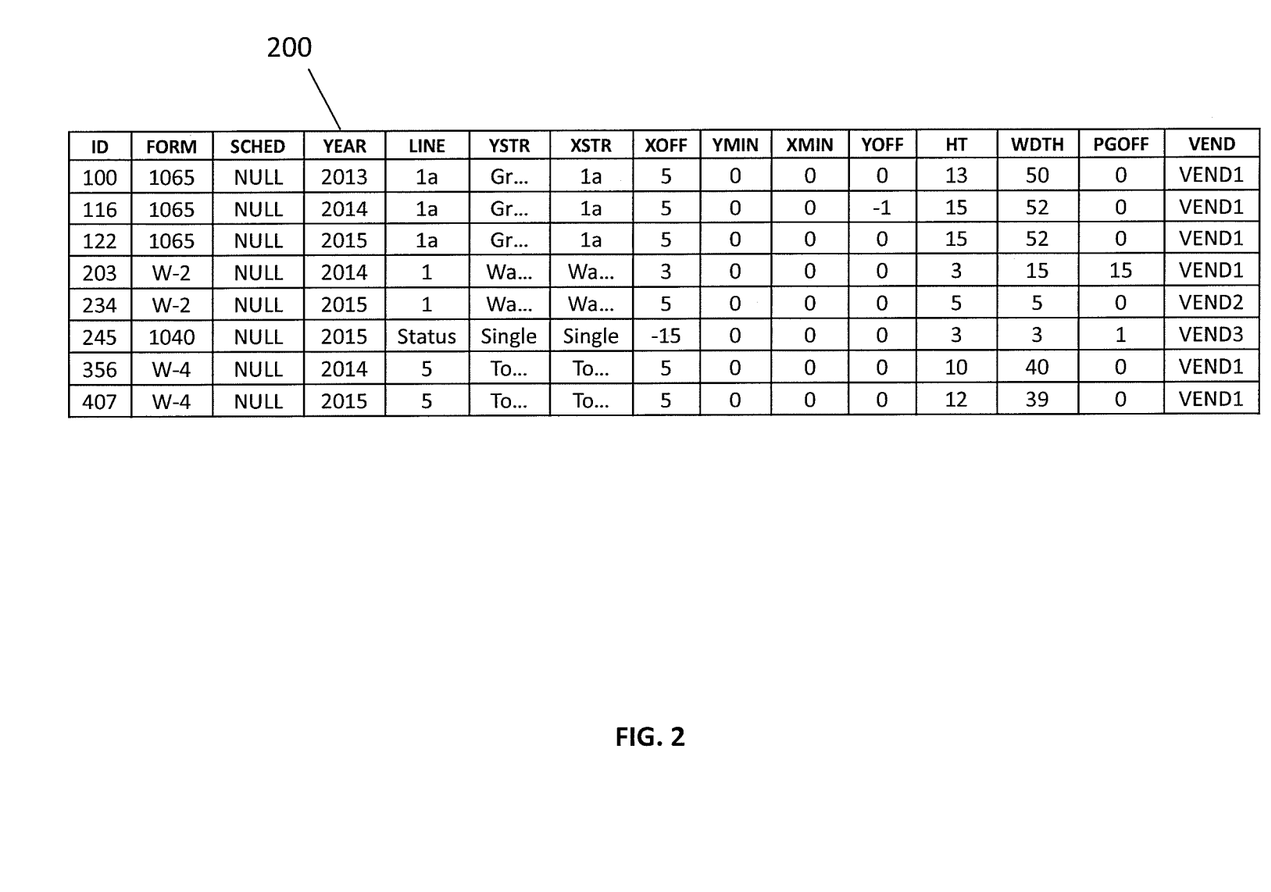
FIG. 2 is a diagram illustrating data associated with extracting data from a portable document format (PDF) file according to an embodiment of the subject matter described herein.

FIG. 2 is a diagram illustrating data 200 associated with extracting data from PDF file 104 according to an embodiment of the subject matter described herein. Data 200 may represent any information associated with extracting or obtaining data in PDF file 104 and/or for identifying a document in PDF file 104. In some embodiments, data 200 may be accessed and/or stored by user(s) 102, data file analyzer 106, identification algorithm 108, and/or extraction algorithm 110. In some embodiments, data 200 may be stored in data storage 112 using various data structures.

In some embodiments, data 200 may be usable for uniquely identifying a document in PDF file 104. For example, data 200 may include document identifiers (phrases, values, keywords, text, etc.) and data identifiers (e.g., line numbers, field descriptors, or labels). In this example, mapping information for identifying one or more detection areas in a document may be indexed using one or more document identifiers and/or one or more data identifiers.

In some embodiments, data 200 may be usable for identifying and/or defining detection areas. For example, data 200 may include various character strings (e.g., reference point identifiers) for identifying x- and y-coordinates of reference points in documents or pages thereof, offset values for offsetting x- and/or y-coordinates of reference points for indicating detection area locations, and/or detection area dimensions (e.g., height and width values) for defining detection areas in the documents or pages thereof.

In some embodiments, data 200 may be updated periodically. For example, as tax forms or other documents are updated or changed, information associated with extracting or obtaining data from such documents may be updated or changed. In this example, data 200 may be modified yearly or semi-yearly so as to accurately identify, detect, and/or extract data from current and/or future tax forms or other documents.

Referring to FIG. 2, data 200 may be depicted using a table where each row represents mapping information for identifying and/or defining a particular detection area in a particular document. For example, each row may comprise columns and/or fields for uniquely identifying a document and data of interest therein (e.g., a Form ID, a Schedule ID, a document year, a line ID, and a vendor ID) and columns and/or fields for defining a detection area in the document (e.g., a 'y' string ID, an 'x' string ID, an 'x' offset value, a 'y' minimum value, an 'x' minimum value, a 'y' offset value, a height value, a width value, and a page offset value).

An 'ID' field may comprise a value, a name, and/or a related identifier for indicating a particular set (e.g., row) of information usable for extraction, identification, or detection of particular data of interest. For example, an 'ID' field value may include a unique number or name, such as '1', '2', and '3'. In another example, an 'ID' field value may be hierarchical and may include a first portion that represents a document and a second portion that represents a unique data portion (e.g., a line number) in the document, e.g., 'DOC1-1a', 'DOC1-1b', and 'DOC1-2'.

A 'Form' field may comprise a value, a name, and/or a related identifier for indicating a particular document or template. For example, a 'Form' field value may represent an IRS tax form, such as '1065', '1098', '8825', 'W-2', W-4', or '1040'.

A 'Sched' field may comprise a value, a name, and/or a related identifier for indicating a particular schedule or a distinct portion of a document or template. For example, a 'Sched' field value may represent an IRS Schedule document or form, such as 'K-1'.

A 'Year' field may comprise a date, a number, and/or a related identifier for indicating a year or a date associated with a document. For example, a 'Year' field value may represent a year associated with an IRS tax form, such as '2013', '2014', or '2015'.

A 'Line' field may comprise a value, a name, and/or a related identifier for indicating a particular data of interest. For example, a 'Line' field value may represent a label or a line number in an IRS tax form, such as '1', '2a', or '2b'.

A 'Ystr' field may comprise a value and/or a related identifier for indicating a character string that indicates a y-coordinate for a reference point in a document. For example, a 'Ystr' field value may represent a phrase or a word that is unique in an IRS tax form. In this example, assuming a 'Ystr' field value is found in a document with pixels coordinates of (80, 125), a reference point for the document may be associated with a y-coordinate of '125' pixels.

An 'Xstr' field may comprise a value, and/or a related identifier for indicating a character string that indicates an x-coordinate for a reference point in a document. For example, an 'Xstr' field value may represent a phrase or a word that is unique in an IRS tax form. In this example, assuming an 'Xstr' field value is found in a document with pixels coordinates of (20, 185), a reference point for the document may be associated with an x-coordinate of '20' pixels.

An 'Xoff' field may comprise a value, a number, and/or a related identifier for indicating an offset from the x-coordinate of a reference point. For example, an 'Xoff' field value may indicate a number of pixels to offset or adjust the x-coordinate of a reference point for a first page of PDF file 104. In this example, the 'Xoff' field value may be used to identify the x-coordinate value of the top left corner of a detection area on the first page by adding the 'Xoff' field value and the X-coordinate value of the reference point on the first page. In some embodiments, an 'Xoff' field value may be in pixels, inches, millimeters, or another unit of measurement.

A 'Ymin' field may comprise a value, a number, and/or a related identifier for indicating a minimum value for which the y-coordinate of a reference point can be found. For example, a page in PDF file 104 may include a 'Ystr' field value in multiple locations. In this example, extraction algorithm 110 may ignore any instance of the 'Ystr' field value located on the page where the y-coordinate of the instance is less than a corresponding 'Ymin' field value. In some embodiments, a 'Ymin' field value may be in pixels, inches, millimeters, or another unit of measurement.

An 'Xmin' field may comprise a value, a number, and/or a related identifier for indicating a minimum value for which the x-coordinate of a reference point can be found. For example, a page in PDF file 104 may include an 'Xstr' field value in multiple locations. In this example, extraction algorithm 110 may ignore any instance of the 'Xstr' field value located on the page where the x-coordinate of the instance is less than a corresponding 'Xmin' field value. In some embodiments, an 'Xmin' field value may be in pixels, inches, millimeters, or another unit of measurement.

A 'Yoff' field may comprise a value, a number, and/or a related identifier for indicating an offset from the y-coordinate of a reference point. For example, a 'Yoff' field value may indicate a number of pixels from the y-coordinate of a reference point for a first page of PDF file 104. In this example, the 'Yoff' field value may be used to identify the y-coordinate value of the top left corner of a detection area on the first page by adding the 'Yoff' field value and the y-coordinate value of the reference point on the first page. In some embodiments, a 'Yoff' field value may be in pixels, inches, millimeters, or another unit of measurement.

An 'HT' field may comprise a value, a number, and/or a related identifier for indicating a height of a detection area. For example, an 'HT' field value may indicate that a detection area is to extend '100' pixels below a defined top left corner. In some embodiments, an 'HT' field value may be in pixels, inches, millimeters, or another unit of measurement.

A 'WDTH' field may comprise a value, a number, and/or a related identifier for indicating a width of a detection area. For example, a 'WDTH' field value may indicate that a detection area is to extend '120' pixels right from a defined top left corner. In some embodiments, a 'WDTH' field value may be in pixels, inches, millimeters, or another unit of measurement.

A 'Pgoff' field may comprise a value, a number, and/or a related identifier for indicating an offset associated with a page of a document. In some embodiments, a 'Pgoff' field value may affect other offset values associated with a given data of interest. For example, when determining where a reference point is on a page, extraction algorithm 110 may add the page offset and the y-coordinate offset together. In some embodiments, a 'Pgoff' field value may be in pixels, inches, millimeters, or another unit of measurement.

A 'Vend' field may comprise a value, a name, and/or a related identifier for indicating a PDF producer application that generates PDF file 104. In some embodiments, a 'Vend' field value may indicate that mapping information is associated with a particular IRS tax form generated by a particular tax software and/or accounting program.

It will also be appreciated that data 200 is for illustrative purposes and that additional and/or different data than depicted in FIG. 2 may be usable for extracting or obtaining data from a data file (e.g., PDF file 104) or for identifying a document in a data file (e.g., PDF file 104). Further, data 200 may be stored or managed using various data structures and/or computer readable media. Further, some data 200 may be stored in separate and/or different locations.

Figure 3:
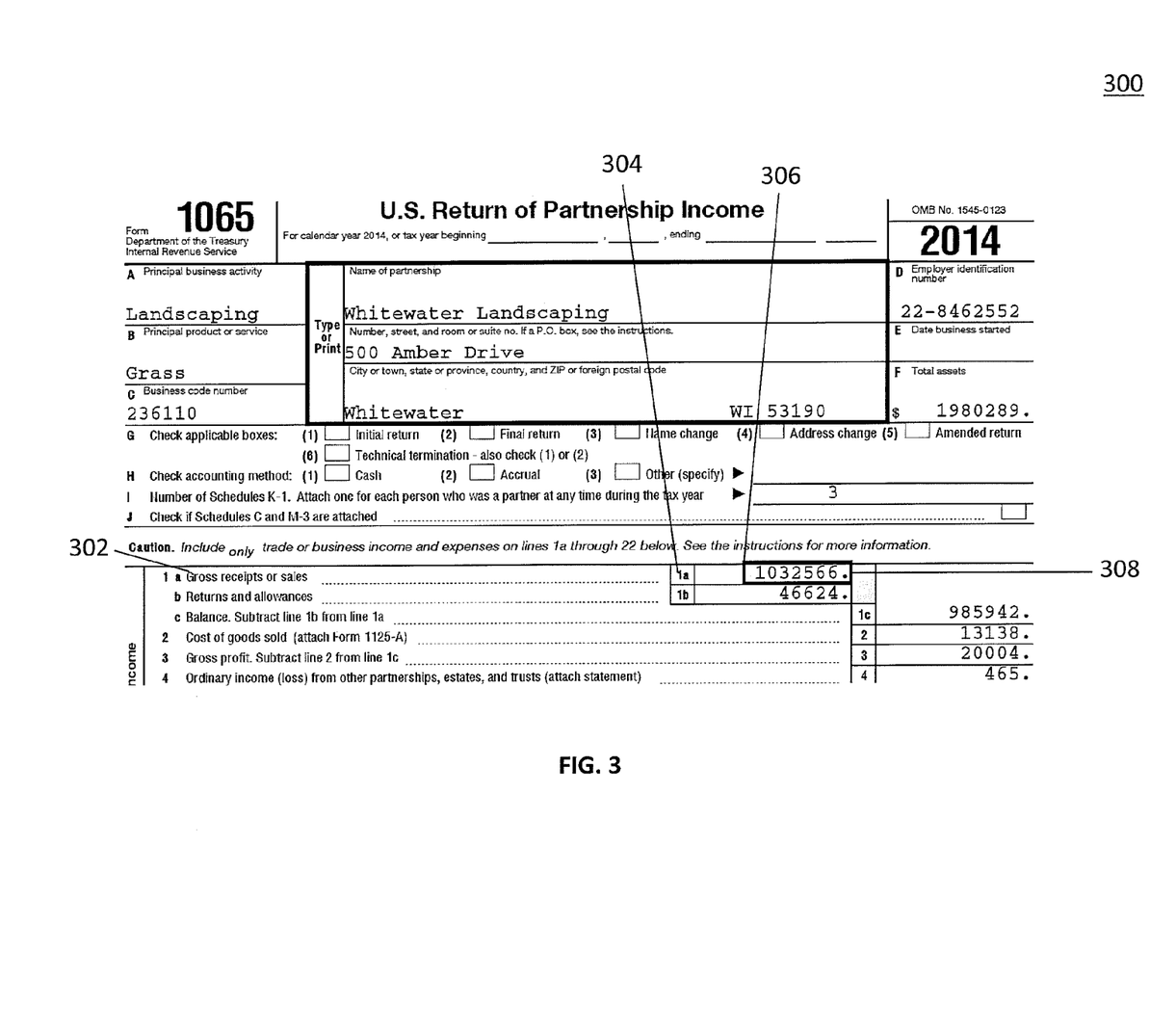
FIG. 3 is a diagram illustrating a detection area associated with an Internal Revenue Service (IRS) Form 1065 according to an embodiment of the subject matter described herein.

FIG. 3 is a diagram illustrating a detection area 308 associated with an IRS Form 1065 300 according to an embodiment of the subject matter described herein. In some embodiments, data file analyzer 106, identification algorithm 108, and/or extraction algorithm 110 may utilize detection areas for extracting data from various lines or fields of IRS Form 1065 300. For example, IRS Form 1065 300 may represent a tax document for reporting partnership income.

Referring to FIG. 3, various portions of IRS Form 1065 300 for defining and/or identifying detection area 308 are depicted. Portion 302 may represent a character string associated with a 'Ystr' field value and may indicate the y-coordinate for a reference point usable to locate or define detection area 308. For example, extraction algorithm 110 may be configured to search and/or analyze IRS Form 1065 300 for a character string associated with a 'list' field value and may store the y-coordinate where the character string is located in IRS Form 1065 300. In this example, after identifying a y-coordinate associated with the character string, extraction algorithm 110 may search and/or identify additional portions, such as portion 304 and portion 306, using data 200.

Portion 304 may represent a character string associated with an 'Xstr' field value and may indicate the x-coordinate for a reference point usable to locate or define detection area 308. For example, after locating a y-coordinate for a reference point in IRS Form 1065 300, extraction algorithm 110 may be configured to search and/or analyze IRS Form 1065 300 for a character string associated with an 'Xstr' field value and may store an x-coordinate where the character string is located in IRS Form 1065 300. In this example, after identifying the x-coordinate associated with the character string, extraction algorithm 110 may adjust the x-coordinate and/or the y-coordinate using one or more offset values.

Portion 306 may represent a top left corner of detection area 308 in IRS Form 1065 300. Portion 306 may be determined by adding an x-coordinate offset value (e.g., an 'Xoff' field value) to a previous identified x-coordinate of a reference point and by adding a y-coordinate offset value (e.g., a 'Yoff' field value) to a previous identified y-coordinate of a reference point. For example, assuming an 'x' offset value is '5' pixels and an x-coordinate for an x-coordinate related reference point is '120' pixels and assuming an 'y' offset value is '0' pixels and a y-coordinate for a y-coordinate related reference point is '80' pixels, the top left corner of detection area may be located at (125, 80), e.g., an x-coordinate of '125' pixels and a y-coordinate of '80' pixels.

Detection area 308 may represent a portion of IRS Form 1065 300 for data extraction. In some embodiments, detection area 308 may be defined using x- and y-coordinates for the top left corner of detection area 308 and height and width values (e.g., a 'HT' field value and a 'WDTH' field value). For example, assuming that a top left corner of detection area 308 is located at (125, 80) and that detection area 308 is to be 3 pixels in height and 10 pixel in width, a bottom right corner of detection area 308 may be located at (135,83) As depicted in FIG. 3, detection area 308 may represent a rectangle-shaped portion of IRS Form 1065 300 defined by using page related coordinates (e.g., x- and y-coordinates indicating a top left corner of a detection area) and/or size information. In this example, data file analyzer 106, identification algorithm 108, and/or extraction algorithm 110 may request that a PDF related API extract data located within the detection area and the PDF related API may provide the extracted data, e.g., by identifying and/or converting relevant binary code or data of PDF file 104 into human-readable characters (e.g., text and/or values).

In some embodiment, detection area 308 may represent a virtual box or other virtual shape defined using predetermined mapping information, e.g., detection area 308 is not depicted, drawn, or visually represented in PDF file 104. Further, while detection area 308 may include a physical (e.g., a depicted or drawn) rectangle comprising four black lines or other depicted boundaries in IRS form 1065, extraction algorithm 110 may avoid using image analysis to identify these depicted boundaries or detection area 308. Instead of performing image analysis on a digital document for identifying detection area 308, extraction algorithm 110 may use predetermined mapping information to identify a document related reference point and may then use predetermined offset values and the document related reference point for indicating a location for detection area 308 and may also use predetermined size information for defining the size (e.g., dimensions) of detection area 308.

In some embodiments, detection areas and/or characteristics thereof (e.g., usage, size, shape, location, etc.) may be predefined or predetermined. For example, prior to data file analyzer 106 receiving PDF file 104, data file analyzer 106 may have access to a data store containing information for defining detection areas for numerous documents. In this example, data file analyzer 106 or a related entity (e.g., extraction algorithm 110) may attempt to identify a document by inspecting pages of PDF file 104 for one or more known or predetermined document identifiers. Continuing with this example, once a document is identified, data file analyzer 106 or a related entity (e.g., extraction algorithm 110) may access and use relevant information in the data storage in defining detection area 308 for data extraction.

In some embodiments, detection areas and/or characteristics thereof may be dynamic. For example, when analyzing a digital page of PDF file 104, data file analyzer 106 may be unaware of where document identifiers or data of interest are located on the page. In this example, data file analyzer 106 or a related entity (e.g., extraction algorithm 110) may attempt to identify a title, a tax form name, a tax form year number and/or another document identifier by dynamically defining a detection area that encompasses the whole page, extracting data from within the detection area, and analyzing the extracted data for identifying known identifiers (e.g., keywords, numbers, or other information). In another example, data file analyzer 106 or a related entity (e.g., extraction algorithm 110) may dynamically define a detection area (e.g., change location or size of detection area) based on previous extracted data and/or expected content.

It will be appreciated that FIG. 3 is for illustrative purposes and that additional and/or different data than that depicted in FIG. 3 may be usable for defining detection areas.

Figure 4:
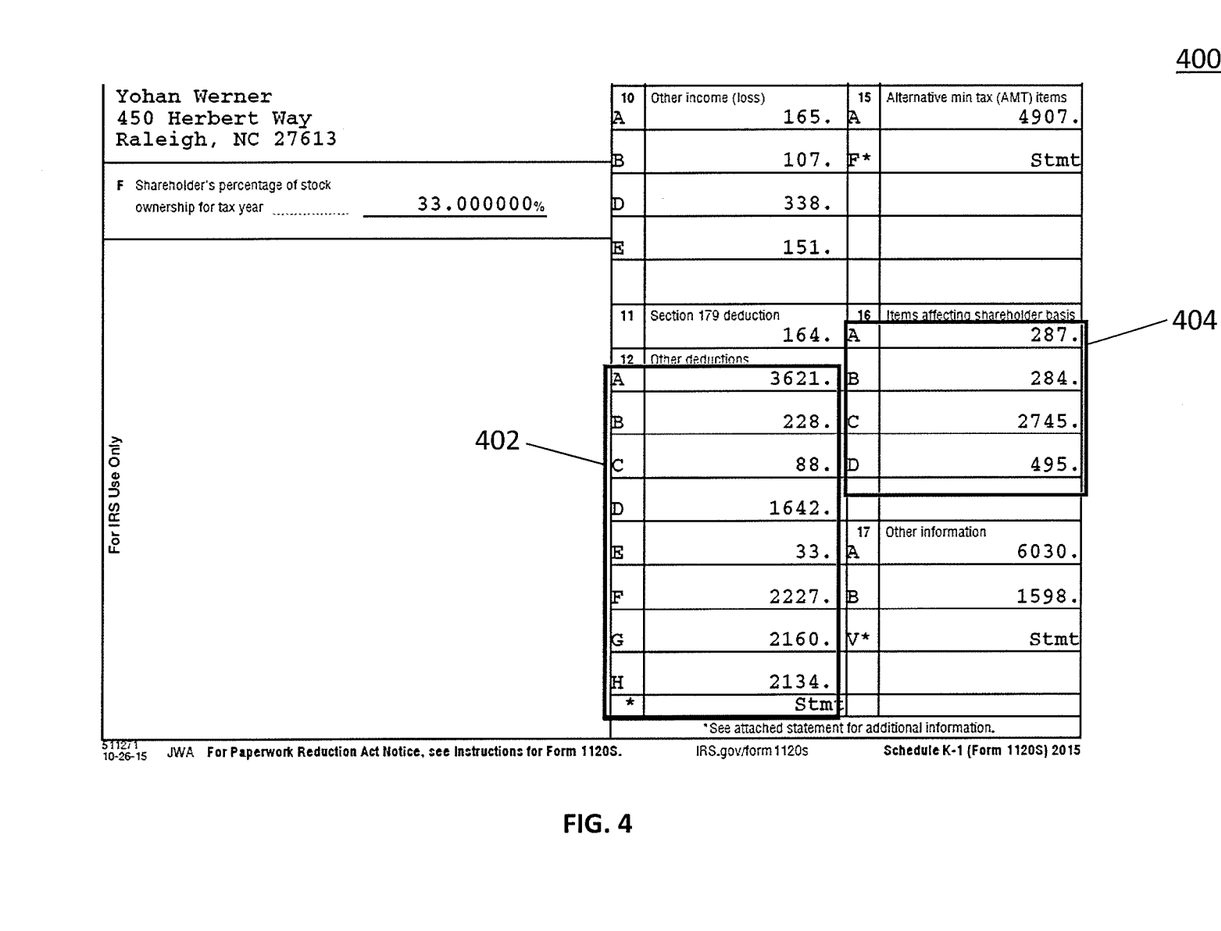
FIG. 4 is a diagram illustrating multiple detection areas associated with an IRS Schedule K-1 document according to an embodiment of the subject matter described herein.

FIG. 4 is a diagram illustrating multiple detection areas 402 and 404 associated with an IRS Schedule K-1 document 400 according to an embodiment of the subject matter described herein. In some embodiments, data file analyzer 106, identification algorithm 108, and/or extraction algorithm 110 may utilize detection areas for extracting data from various lines or fields of IRS Schedule K-1 document 400. For example, IRS Schedule K-1 document 400 may represent a tax document for an S corporation. In this example, Schedule K-1 document 400 may report each shareholder's share of income, deductions, losses, and credits.

Referring to FIG. 4, IRS Schedule K-1 document 400 may include detection area 402 and detection area 404. Detection area 402 may identify a portion of Schedule K-1 document 400 usable for reporting line '12 Other Deductions' information and detection area 404 may identify a portion of Schedule K-1 document 400 usable for reporting line 16 Items affecting shareholder basis' information.

In some embodiments, where detection area 402 and detection area 404 include numerous values or character strings, data file analyzer 106, identification algorithm 108, and/or extraction algorithm 110 may utilize various logic or techniques for parsing or separating each value or character strings before storing or using the extracted data.

It will be appreciated that FIG. 4 is for illustrative purposes and that additional and/or different detection areas may be used for extracting data from IRS Schedule K-1 document 400.

Figure 5:
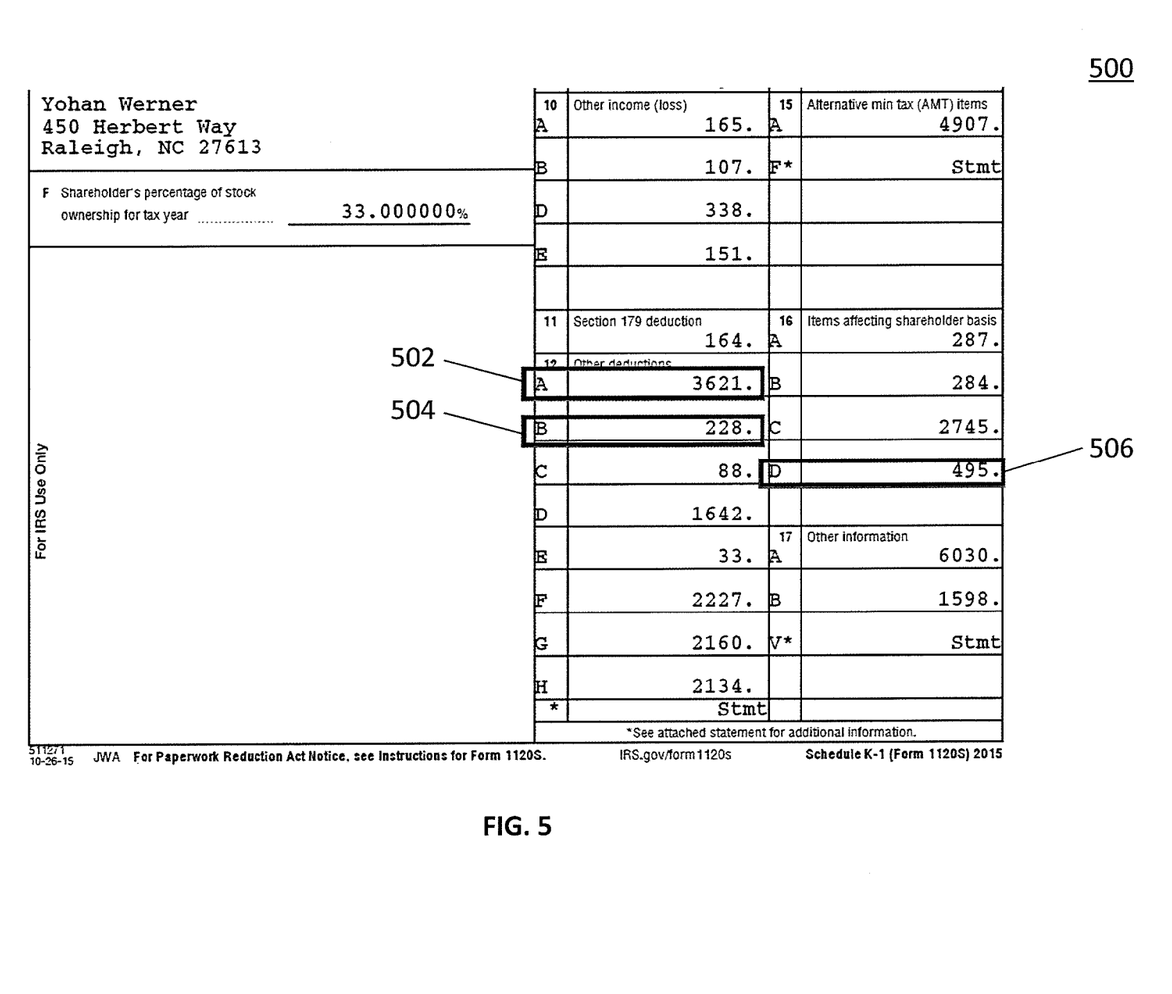
FIG. 5 is a diagram illustrating a conditional detection area associated with an IRS Schedule K-1 document according to an embodiment of the subject matter described herein.

FIG. 5 is a diagram illustrating a conditional detection area 506 associated with an IRS Schedule K-1 document 500 according to an embodiment of the subject matter described herein. In some embodiments, data file analyzer 106, identification algorithm 108, and/or extraction algorithm 110 may utilize detection areas for extracting data from various lines or fields of IRS Schedule K-1 document 500.

In some embodiments, a detection area and/or characteristics thereof (e.g., usage, size, shape, location, etc.) may be utilized or not utilized depending on a variety of factors and/or conditions. Some factors and/or conditions that can affect a detection area or usage thereof may include document related information (e.g., type of tax form, year of tax form, etc.) and/or previously extracted data. For example, if extracted data from an IRS Form 1040 indicates that the IRS Form 1040 includes itemized deductions, extraction algorithm 110 may define and use detection areas for extracting the itemized deductions from the IRS Form 1040.

Referring to FIG. 5, IRS Schedule K-1 document 500 may include detection areas 502, 504, and 506. Each of detection areas 502 and 504 may represent an unconditional or default detection area. For example, an unconditional or default detection area may be a detection area that is defined and/or used (e.g., by extraction algorithm 110) for extracting mandatory data from a given document. In this example, extraction algorithm 110 may utilize unconditional or default detection areas, such as detection areas 502 and 504, for extracting data in locations of IRS Schedule K-1 document 500 that are mandatory or that are generally not left blank.

Detection area 506 may represent a conditional detection area that may be defined and/or used (e.g., by extraction algorithm 110) only if certain conditions are met. In some embodiments, conditional detection areas, such as detection area 506, may be defined for extracting data in locations of IRS Schedule K-1 document 500 that are optional or that may be left blank. For example, extraction algorithm 110 may utilize a conditional detection area, such as detection area 506, if data extracted from detection areas 502 and/or 504 indicates that data of interest exists within conditional detection area 506 of IRS Schedule K-1 document 500.

It will be appreciated that FIG. 5 is for illustrative purposes and that additional and/or different factors and/or conditions than those depicted in FIG. 5 may be usable for defining conditional detection areas.

Figure 6:
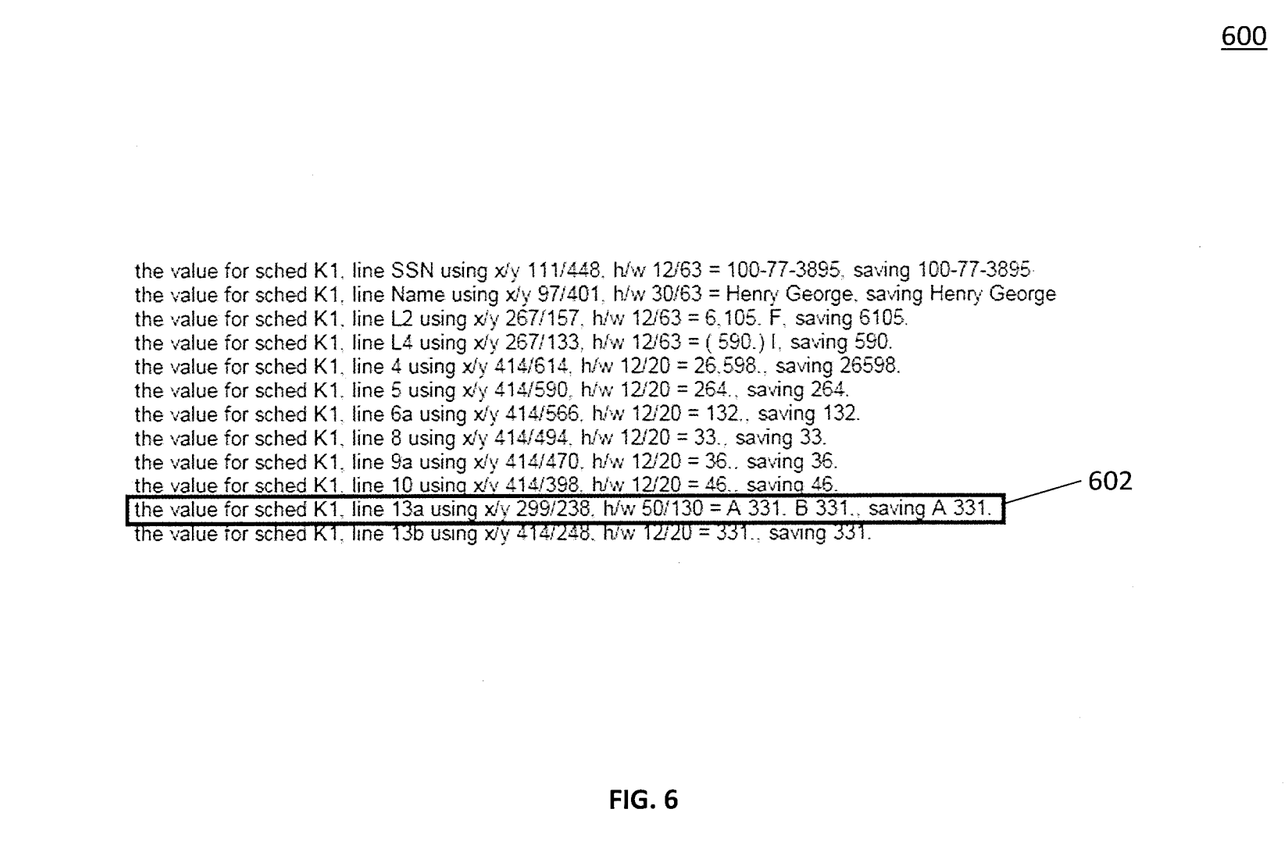
FIG. 6 is a diagram illustrating log data associated with extracting data from a PDF file according to an embodiment of the subject matter described herein.

FIG. 6 is a diagram illustrating log data 600 associated with extracting data from PDF file 104 according to an embodiment of the subject matter described herein. In some embodiments, data file analyzer 106, identification algorithm 108, extraction algorithm 110, and/or another module or algorithm may store log data 600 for testing, validation, and/or other purposes.

In some embodiments, log data 600 may be maintained or stored for each PDF file 104 and/or each document therein.

For example, as depicted in FIG. 6, a log file may store log data 600 for an IRS Schedule K-1 document. In this example, the log file may store various attributes or information about a detection area, a line number, and/or or a data field associated with the IRS schedule K-1 document.

In some embodiments, log file 600 may include multiple data entries, such as data entry 602. Data entry 602 may represent particular data of interest that has been extracted from a document stored in PDF file 104 by extraction algorithm 110. Data entry 602 may indicate the document name or document type and the data field or line that was extracted (e.g., 'the value for sched K1, line 13a'), coordinates (e.g., in pixels) of the top left corner for a detection area (e.g., 'x/y 299/238') and size information indicating a height and width (e.g., in pixels) for the detection area (e.g., 'h/w 50/130'). Continuing with the example, data entry 602 may indicate actual data extracted from the detection area (e.g., 'A 331. B 331.'), along with the data that is stored which may be a modified or filtered version of the extracted data (e.g., 'A 331.').

In some embodiments, log data 600 and/or data entry 602 may be usable for identifying invalid data and may be usable for flagging the invalid data or notifying user(s) 102 or another relevant entity (e.g., a service operator). In some embodiments, log data 600 and/or data entry 602 may be usable for determining an appropriate height and width of the detection area and/or appropriate location triggers (e.g., reference point identifiers and/or offset values) for accurately and reliably obtaining particular data of interest.

It will also be appreciated that log data 600 is for illustrative purposes and that additional and/or different data than log data 600 may be usable for testing, validation, and/or other purposes. Further, data 600 may be stored or managed using various data structures and/or computer readable media. Further, some data 600 may be stored in separate and/or different locations.

Figure 7:
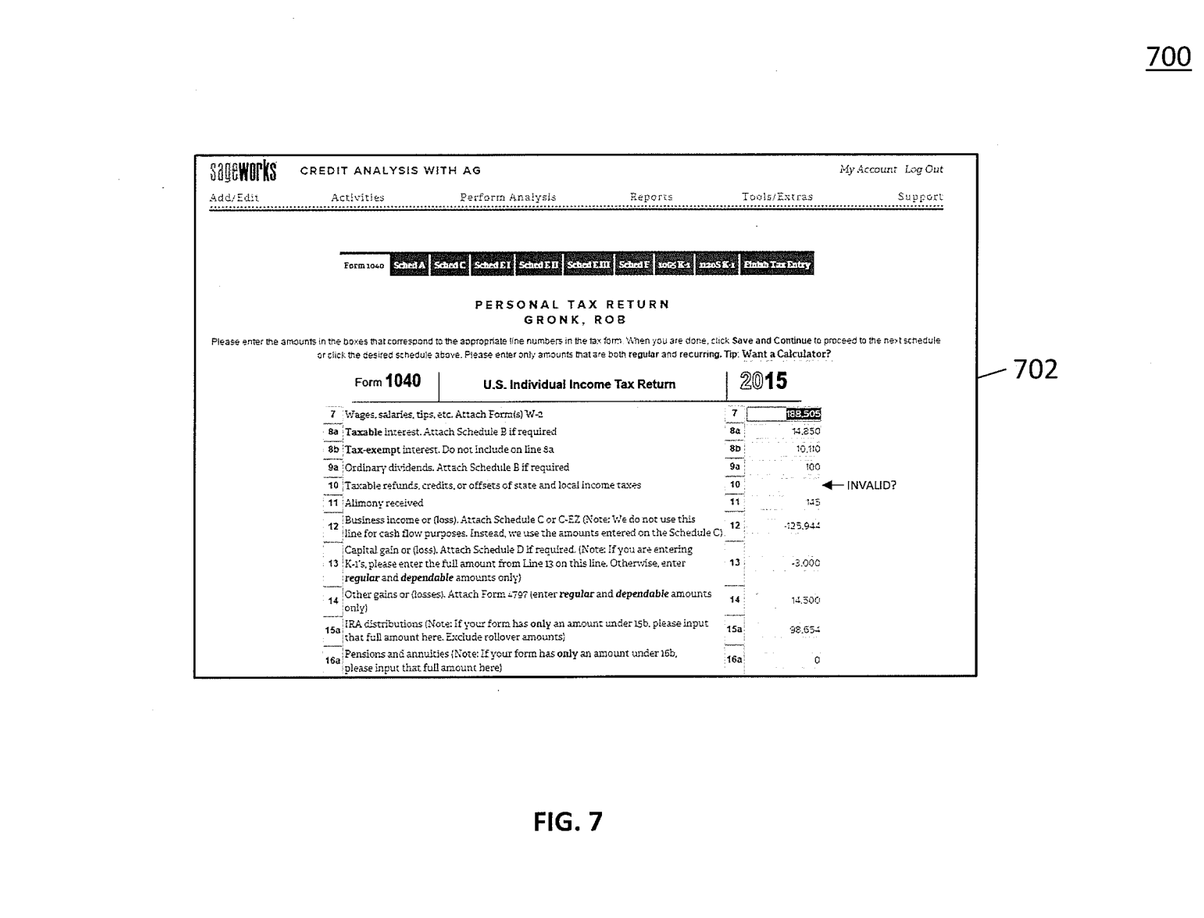
FIG. 7 is a diagram illustrating a graphical user interface for interacting with extracted data according to an embodiment of the subject matter described herein.

FIG. 7 is a diagram illustrating a graphical user interface (GUI) 700 for interacting with extracted data according to an embodiment of the subject matter described herein. In some embodiments, data file analyzer 106, and/or an associated module, algorithm or node may generate and/or provide GUI 700 for providing, receiving, displaying, and/or interacting with extracted data from PDF file 104 or another data file. In some embodiments, GUI 700 may include a web based interface, e.g., a web page presented to user(s) 102 via a web browser application.

GUI 700 may represent any suitable user interface (UI) container or UI window for displaying or providing content to user(s) 102. In some embodiments, GUI 700 may include UI elements for displaying and/or modifying extracted data from PDF file 104. For example, data file analyzer 106 may use extraction algorithm 110 to obtain or extract data from one or more documents stored in PDF file 104. In this example, data file analyzer 106 may utilize GUI 700 for displaying the extracted data and/or for allowing changes to the extracted by user(s) 102.

In some embodiments, GUI 700 may depict a digital version of a document. For example, as depicted in FIG. 7, GUI 700 may include labels, descriptions, and text boxes containing values from an IRS Form 1040 stored in PDF file 104. In this example, each text box may contain extracted data and may be editable by user(s) 102. For example, GUI 700 may represent a digital version of an IRS Form 1040 with extracted values for different line items. In this example, GUI 700 may include a text box representing a value from line '7' of an IRS Form 1040 with a description of 'Wages, salaries, tip, etc. Attach Form(s) W-2' and a text box representing a value from line '8a' of an IRS Form 1040 with a description of 'Taxable Interest. Attach Schedule B if required' among others.

In some embodiments, GUI 700 may include UI elements for indicating that extracted data may be invalid or need further review. For example, as depicted in FIG. 7, an arrow, text and/or a symbol (e.g., T or '?') may be display near a text box to indicate that data in the text box is invalid or that user(s) 102 may need to review and/or update the text box.

It will be appreciated that FIG. 7 is for illustrative purposes and that additional and/or different UI elements than those depicted in FIG. 7 may be usable for displaying and/or interacting with extracted data from PDF file 104.

Figure 8:
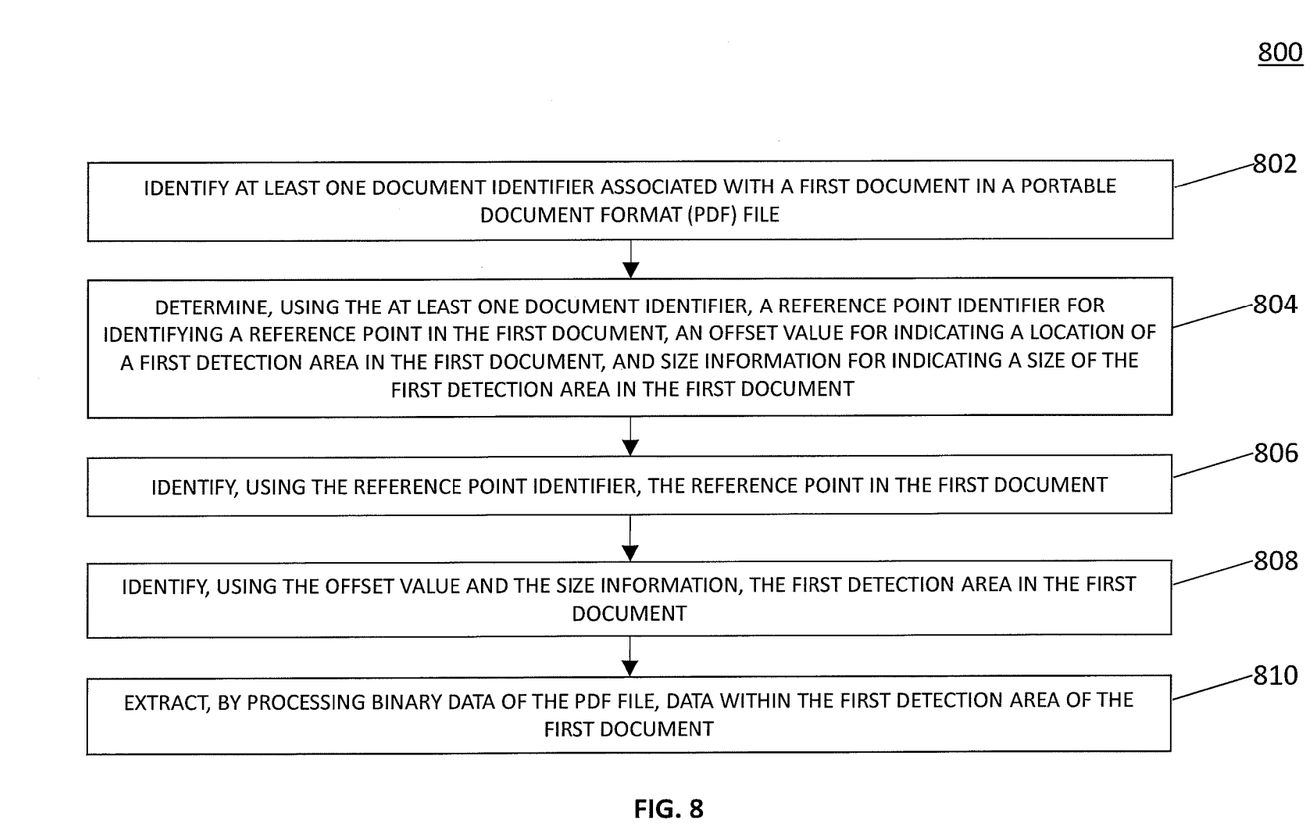
FIG. 8 is a diagram illustrating a process for extracting data from a PDF file according to an embodiment of the subject matter described herein.

FIG. 8 is a diagram illustrating a process 800 for extracting data from a PDF file according to an embodiment of the subject matter described herein. In some embodiments, process 800, or portions thereof (e.g., steps 802, 804, 806, 808, and/or 810), may be performed by or at data file analyzer 106, identification algorithm 108, extraction algorithm 110, and/or another node or module.

Referring to process 800, in step 802, at least one document identifier may be identified for a first document in PDF file 104. For example, data file analyzer 106 may analyze each page of PDF file 104 and may attempt to identify a document identifier or a group of document identifiers that uniquely identify a document.

In some embodiments, identifying at least one document identifier may include searching the first document for the at least one document identifier in predetermined or dynamic locations. For example, data file analyzer 106 may be configured to search a given page or certain portions (e.g., top-middle, left-bottom, etc.) of the page for keywords, phrases, images, page layouts, and/or certain fonts that represent or indicate at least one document identifier.

In some embodiments, a document (e.g., in PDF file 104) may include a financial statement, a financial report, semi-contained content, tabular data, a tax form, an IRS Form 1040, an IRS Form 8825, an IRS Form 1099, an IRS Form 1098, an IRS Form W-2, an IRS Form W-4, or an IRS Form 1065.

In some embodiments, at least one document identifier for identifying a document or form in a PDF file may include a form identifier, a publication year, a document vendor, and/or a PDF producer application identifier associated with the PDF file. For example, data file analyzer 106 may attempt to detect whether a page in PDF file 104 includes a form identifier (e.g., search for the phrase 'W-2' in a particular area of the page) and a form year (e.g., search for the number '2015' within a certain area of the page) and/or may search a metadata field associated with PDF file 104 for identifying a PDF producer application identifier (e.g., 'PDF-MAKER3000', 'PDF-MAKER2000', or 'TAXPROF-X').

In step 804, a reference point identifier for identifying a reference point in the first document, an offset value for indicating a location of a first detection area in the first document, and size information (e.g., height and width values) for indicating a size of the first detection area in the first document may be determined using the at least one document identifier.

In some embodiments, a reference point identifier may include a predetermined character string in the document. For example, a reference point identifier may indicate a phrase, a word, or a label for indicating a reference point in a document.

In some embodiments, a reference point identifier may include a predetermined location in the document. For example, a reference point identifier may indicate x- and y-coordinates or other information for indicating a reference point in a document.

In some embodiments, e.g., where a word or phrase is repeated in a document, a reference point may be determined or identified by using a predetermined character string (e.g., a reference point identifier) and search location information (e.g., minimum values for x- and y-coordinates for indicating where in a document to search for the predetermined character string).

In step 806, the reference point in the first document may be identified using the reference point identifier. For example, extraction algorithm 110 may search a page in PDF file 104 for a predetermined character string and the location of the character string on the page (e.g., x- and y-coordinates associated with the location of the predetermined character string on the page) may be the reference point. In another example, extraction algorithm 110 may search a page in PDF file 104 for two different character strings, where the location of the first character string on the page may indicates the x-coordinate of the reference point and the location of the second character string on the page may indicates the y-coordinate of the reference point.

In step 808, the first detection area in the first document may be identified using the offset value and the size information. For example, after identifying a reference point, extraction algorithm 110 may use a predetermined offset value to determine a top left corner of detection area 308 (e.g., by adding the offset value to the x- or y-coordinate of the reference point). In this example, extraction algorithm 110 may use a predetermined width and height value to further define the location and dimensions of detection area 308.

In step 810, data within the first detection area of the first document may be extracted by processing binary data of the PDF file. For example, data file analyzer 106 may analyze and/or process binary data of PDF file 104 representing the document or page portion within detection area 308. In this example, data file analyzer 106 may process (e.g., translate, convert, interpret, decode, etc.) the binary data to obtain human-readable data represented by the binary data processed.

In some embodiments, extracting data within a detection area of a document may be performed without using OCR or image analysis. For example, instead of using OCR or image analysis to identify relevant text in a digital document, data file analyzer 106 may process binary data of PDF file 104 to obtain human-readable text represented by the binary data processed.

In some embodiments, extracting data within a detection area of a document may involve using a PDF file reader (and/or a related API) for identifying and interpreting binary data of PDF file 104. For example, a PDF software library, such as iText, may include functionality for reading and/or interpreting binary data of PDF file 104. In this example, data file analyzer 106 may use the PDF software library (e.g., via an API) to identify the text stored within a particular area of a document (e.g., detection area 308) in PDF file 104.

In some embodiments, PDF file 104 may include a second document associated with one or more detection areas for data extraction. For example, PDF file 104 may include multiple IRS Schedule K-1 forms, each with multiple data fields containing data of interest. In this example, data file analyzer 106 may identify and extract the data of interest by defining a detection area for each of the relevant data fields of the IRS Schedule K-1 forms.

In some embodiments, data file analyzer 106 may store data (e.g., extracted from detection area 308 in a PDF file) in a data structure (e.g., in data storage 112) based on at least one document identifier. For example, data file analyzer 106 may identify a particular data entry (e.g., row data from FIG. 2)

based on at least one document identifier (e.g., a Form name, a Form year, and/or a document creator (e.g., PDF producer application). In this example, the particular data entry may include information (e.g., a 'line' value) usable for indicating a data structure and/or a data field where extracted data is to be stored by data file analyzer 106.

In some embodiments, data file analyzer 106 may analyze data (e.g., extracted from detection area 308 in a PDF file) for invalid information and may notify user(s) 102 about the invalid information. For example, data file analyzer 106 may use a user interface to flag or otherwise indicate that some data was not extracted and/or that extracted data appears to be invalid.

It will be appreciated that process 800 is for illustrative purposes and that different and/or additional actions may be used. It will also be appreciated that various actions described herein may occur in a different order or sequence.

It should be noted that data file analyzer 106 and/or functionality described herein may constitute a special purpose computing device. Further, data file analyzer 106 and/or functionality described herein can improve the technological field of data extraction from PDF files or other data files that store documents having tabular data and/or semi-constrained data. For example, by using a reference point and an offset value to identify a detection area for obtaining data of interest, data file analyzer 106 may identify and extract data from a PDF file containing different tax forms and/or variations of such forms, e.g., without needing the data in the PDF file to be rekeyed (e.g., manually entered) as required by some techniques or systems. Further, by obtaining human-readable data from binary data of a PDF file, such data extraction is more reliable and accurate than OCR related techniques that require image analysis to identify characters.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as group forth hereinafter.

What is claimed is:

1. A method for extracting data from a portable document format (PDF) file, the method comprising:
   identifying at least one document identifier associated with a first document in a portable document format (PDF) file;
   determining, using the at least one document identifier, a reference point identifier in the first document, an offset value for indicating a location of a first detection area in the first document, and size information for indicating a size of the first detection area in the first document;
   identifying, using the reference point identifier, the reference point in the first document;
   identifying, using the offset value and the size information, the first detection area in the first document; and
   extracting, by processing binary data of the PDF file, data within the first detection area of the first document.

2. The method of claim 1 wherein extracting the data is performed without using optical character recognition (OCR).

3. The method of claim 1 wherein identifying at least one document identifier includes searching the first document for the at least one document identifier in predetermined or dynamic locations.

4. The method of claim 1 wherein extracting the data within the detection area of the first document includes using a PDF file reader application programming interface (API) for identifying and interpreting binary data of the PDF file.

5. The method of claim 1 wherein the at least one document identifier includes a form identifier, a publication year, a document vendor, or a PDF producer application identifier associated with the PDF file.

6. The method of claim 1 wherein the PDF file includes a second document associated with one or more detection areas for data extraction.

7. The method of claim 1 wherein the reference point identifier includes a predetermined character string or a predetermined location in the first document.

8. The method of claim 1 comprising:
   storing the data in a data structure based on the at least one document identifier.

9. The method of claim 1 comprising:
   analyzing the data for invalid information; and
   notifying a user about the invalid information.

10. The method of claim 1 wherein the first document includes a financial statement, a financial report, semi-contained content, tabular data, a tax form, an Internal Revenue Service (IRS) Form 1040, an IRS Form 8825, an IRS Form 1099, an IRS Form 1098, an IRS Form W-2, an IRS Form W-4, or an IRS Form 1065.

11. A system for extracting data from a portable document format (PDF) file, the system comprising:
   a data file analyzer comprising:
      at least one processor; and
      a memory,
   wherein the data file analyzer is configured to identify at least one document identifier associated with a first document in a portable document format (PDF) file, to determine, using the at least one document identifier, a reference point identifier for identifying a reference point in the first document, an offset value for indicating a location of a first detection area in the first document, and size information for indicating a size of the first detection area in the first document, to identify, using the reference point identifier, the reference point in the first document, to identify, using the offset value and the size information, the first detection area in the first document, and to extract, by processing binary data of the PDF file, data within the first detection area of the first document.

12. The system of claim 11 wherein extracting the data is performed without using optical character recognition (OCR).

13. The system of claim 11 wherein the data file analyzer is configured to search the first document for the at least one document identifier in predetermined or dynamic locations.

14. The system of claim 11 wherein the data file analyzer is configured to extract the data within the detection area of the first document by using a PDF file reader application programming interface (API) for identifying and interpreting binary data of the PDF file.

15. The system of claim 11 wherein the at least one document identifier includes a form identifier, a publication year, a document vendor, or a PDF producer application identifier associated with the PDF file.

16. The system of claim 11 wherein the PDF file includes a second document associated with one or more detection areas for data extraction.

17. The system of claim 11 wherein the reference point identifier includes a predetermined character string or a predetermined location in the first document.

18. The system of claim 11 wherein the data file analyzer is configured to store the data in a data structure based on the at least one document identifier.

19. The system of claim 11 wherein the data file analyzer is configured to analyze the data for invalid information and to notify a user about the invalid information.

20. The system of claim 11 wherein the first document includes a financial statement, a financial report, semi-contained content, tabular data, a tax form, an Internal Revenue Service (IRS) Form 1040, an IRS Form 8825, an IRS Form 1099, an IRS Form 1098, an IRS Form W-2, an IRS Form W-4, or an IRS Form 1065.

21. A non-transitory computer readable medium having stored thereon computer-executable instructions that when executed by at least one processor of a computer cause the computer to perform steps comprising:
    identifying at least one document identifier associated with a first document in a portable document format (PDF) file;
    determining, using the at least one document identifier, a reference point identifier for identifying a reference point in the first document, an offset value for indicating a location of a first detection area in the first document, and size information for indicating a size of the first detection area in the first document,
    identifying, using the reference point identifier, the reference point in the first document;
    identifying, using the offset value and the size information, the first detection area in the first document; and
    extracting, by processing binary data of the PDF file, data within the first detection area of the first document.

* * * * *